April 4, 1972  T. LOEW  3,654,062
INJECTION MOLDED DECORATIVE PLAQUES
Filed Sept. 28, 1970  2 Sheets-Sheet 1

INVENTOR.
THEODORE LOEW
BY
Meyer, Tilberry & Body
ATTORNEYS.

INVENTOR.
THEODORE LOEW 3,654,062
INJECTION MOLDED DECORATIVE PLAQUES
Theodore Loew, Schenectady, N.Y., assignor to Standard
Products Co., Cleveland, Ohio
Filed Sept. 28, 1970, Ser. No. 75,821
Int. Cl. D21f 13/00; D21h 1/00; D21j 5/00
U.S. Cl. 161—119
4 Claims

ABSTRACT OF THE DISCLOSURE

A molded decorative plaque is provided comprising a body portion of a plastic material and a facing sheet disposed over the front face of the body portion. The front face of the body portion is provided with a decorative contour and a facing sheet conforms to the contour thereof. The facing sheet is a laminated structure comprised of an outer sheet, a layer of metal on the inner surface of the outer sheet and an inner backing sheet of plastic material which is adhesively bonded to the layer of metal. The plastic material of the backing sheet is compatible with the plastic material of the body portion and is joined thereto under heat and pressure to form an integral bond between the body portion and facing sheet. A layer of protective varnish or the like is provided on the outer surface of the facing sheet as an integral part thereof.

BRIEF SUMMARY AND GENERAL STATEMENT OF THE INVENTION

It is among the objects of the present invention to provide a novel method of making decorative plaques, particularly with a protective surfacing sheet and a supporting body of an injection molded plastic material, which may be accomplished by injection molding machinery without special handling or special laminating procedures.

Another object is to provide a novel injection molded plaque which will have a protective surface and an injection molded body combined together as part of an injection molding procedure.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory to form a facing material which is desirably a sheet of polyethylene terephthalate, such as Du Pont's Mylar, which has been suitably surfaced and backed so as to both withstand the injection molding pressure and also to conform to a desired molded shape which will be held after the molding operation has been completed.

It is necessary that the injection molding pressure be spread over the face of the plaque to be produced without rupture or breaking of the facing sheet at any point.

Although Mylar is preferred because of its strength and durability, it is also possible to use suitably coated or impregnated woven or knitted fabrics or other plastic sheeting, such as polyvinyl chloride, polyolefins, ABS, and the like. Preferably the facing sheet laminate includes a thin layer of a varnish which may vary from 1 to 5 mils, which will tend to hold the conformation of the sheet when it is forced into deep corners or around sharp projections.

In such cases the tendency of the sheet to return to its original form might result in separation of the sheet from the injection molded backing and the loss of the faithful reproduction of the recess which has been cut into the mold located in the female injection molding platen.

The preferred surfacing consists of a transparent, relatively durable, not readily abradable thermoplastic varnish of the nature of acrylic varnishes.

Desirably the undersurface of the Mylar sheet is provided with a very thin layer of vacuum deposited metal vapor which is of adhesive character. Although aluminum is preferred, and a variety of metallic effects may be obtained by tinting the Mylar, it is also possible to use silver, gold or other materials of this nature, the Mylar being preferably transparent.

The Mylar may vary in thickness from $1/3$ to 7 mils and it desirably has a thickness of about $1/3$ to 1 mil. The metal thickness may vary from 1/100 to 1/1,000 of a mil and in practice is closer to the lower end of the range.

Desirably a double vinyl layer is applied as the backing of the Mylar adhering to the metallized undersurface. For the first layer, vinyl adhesive is applied which consists of a low vinyl chloride or low vinyl chloride-acetate polymer in low polymeric condition in organic solution, which is brushed or roller coated on the metallized backing face.

The vinyl adhesive backing applied to the metallized undersurface as just described is then covered by a layer of vinyl material acting both as an adhesive and for mechanical strengthening purposes, which may be as thick as the Mylar sheeting and which may have been rolled or calendered on, or may be laminated on. This is the preferred type of backing where the injection molding resin is polyvinyl chloride or polyvinyl chloride-acetate. Where polyethylene or polypropylene is used as the injection molding resin, desirably the adhesive sheeting attached to the undersurface of the Mylar should be of the nature of a polyethylene or polypropylene material, being a relatively soft, low polymerized material.

The injection molded material is desirably forced to the rear of the facing sheet to force it to conform to the recessed face of the mold. Desirably the platen which carries the conduits for the incoming molten plastic which is to be forced into the mold under high pressure first is fed substantially to one side of the mold and then is caused to flow, after an abrupt change of direction, over the face of the mold.

The pressure should be such as to cause the facing material, whether it be Mylar or a woven or knitted fabric or even sheet vinyl plastic, to be stretched and to conform to the recesses and projections which have been formed in the molding cavity. This injection molding preferably takes place at a pressure of about 1,000 to 2,000 pounds per square inch, and at a temperature of about 325 to 375° F. for a period of 5 to 10 seconds.

The sheet during this injection molding is held between the flush closed faces of the male and female platens and desirably during this operation either recesses are formed in the back of the plaque, or projections are formed for attachment purposes.

Where recesses are formed, these are of such shape and distribution as to take up any excess plastic during any subsequent electronic molding procedures in which the backing face of the injection molded plaque is caused to flow into said recesses and avoid flow beyond the edges of the plaque, which would disfigure the attachment or would require difficult cleansing of the periphery thereof.

On the other hand where mechanical attachments are to be used, prongs may be provided on the rear of the plaque to receive an attachment nut or resilient spring connection.

Desirably, the injection molded device is left in the mold until its temperature approaches about 200 to 250° F., where the junction of the injection molded plastic will have been integrated with the vinyl backing on the Mylar sheeting.

When the platens are separated, the molded plaque may then be removed, attached to extensions of the facing fabric on all sides. These extensions are then cut off so that the body portion of injection molded resin will extend below the facing sheet a substantial distance, varying from 1/64 to as much as 1/8 of an inch where desired, but preferably about 1/32 or 1/64 of an inch.

The purpose of this extension is to prevent the Mylar sheet from ever contacting the base upon which the plaque is mounted during subsequent electronic sealing operations. This extension of the plastic body may be as little as .020 to .040" and even after sealing, with the excess plastic being drawn into the recesses, there will be a spacing of .005 to .010".

Where varnished or impregnated woven or knitted cloth or fabric is substituted for the Mylar or where vinyl or other thermoplastic sheetings are substituted, suitable modifications may be made.

BRIEF DESCRIPTION OF THE DRAWINGS

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

DESCRIPTION OF THE PREFERRED EMBODIMENTS

Figure 1:
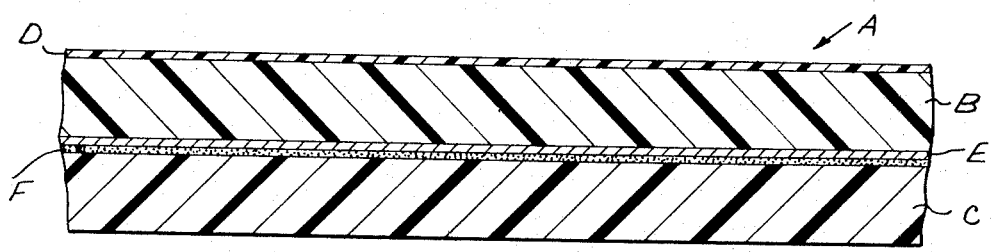
FIG. 1 is a fragmentary diagrammatic transverse sectional view of the sheeting material which is used for facing purposes.

Referring to FIG. 1, there is shown the facing sheet A in the form of a laminate. The various thicknesses may be different from those shown, and the principal thickness consists of the main outer or covering sheet B which is desirably polyethylene terephthalate or Mylar and the main backing sheet C which may be a polyvinyl chloride lamination sheeting or backing.

These may have a thickness of .001" to .025", with the Mylar being desirably no more than 1/2 and in many cases 1/4 the thickness of the vinyl backing.

In lieu of the Mylar, other sheeting materials may be used. Whether cloth or fabric is utilized, and whether knitted, woven or nonwoven, the fabric is suitably impregnated, varnished or coated to withstand the injection pressure of 1,000 pounds per square inch.

Depending upon the type of plastic which is injection molded to serve as a body for the plaque, the undersheet C is desirably of a material which will integrate or be compatible with the injection molding plastic, whether it be cellulose acetate, styrene, polyvinyl chloride, polyethylene, polypropylene or ABS. Desirably, the backing sheet C is of a related or identical plastic as the one being injection molded, but in a much lower state of polymerization and containing substantially large amounts of solvent and a plasticizer ranging from 10 to 40%.

The facing of surfacing D of the Mylar sheet B may be a tough durable varnish or lacquer which will hold the Mylar sheeting B in conformation to the design of the mold, after the injection molding pressure has been released. Desirably it may be an acrylic varnish of about 1/10 to 2 mils.

Among the various lacquers that may be employed are acrylic, polyester, epoxy, or polyurethane lacquers. The effect of these lacquers is that when the plaque is kept in the mold until it is cooled to a temperature of from 125° to 250° F., it will retain fine details of the pattern and of the mold, particularly where there may be engraving or striations or delicate finishes which normally would not be retained by the Mylar.

The underface of the Mylar B is desirably coated with a very thin layer E of metal, preferably vacuum deposited aluminum or other suitable inert metals. The metallizing gives a better facing effect to the Mylar sheeting B and it also enables better adhesion to the thin intermediate vinyl adhesive layer F which acts to anchor the vinyl backing C to the Mylar B.

Figure 2:
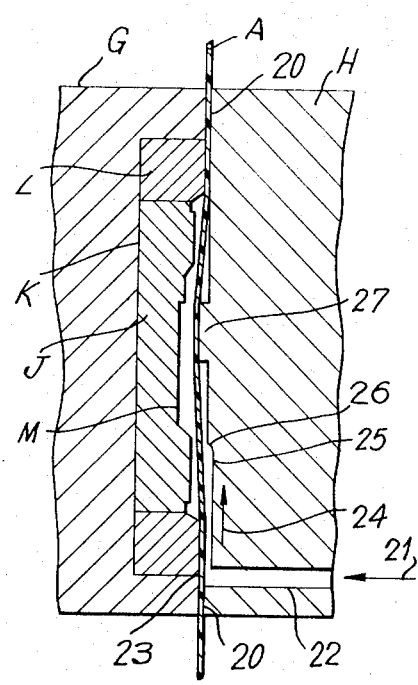
FIG. 2 is a diagrammatic transverse sectional view showing the platens of an injection molding machine closed to permit injection of a plastic material to form the body of the plaque.
Figure 3:
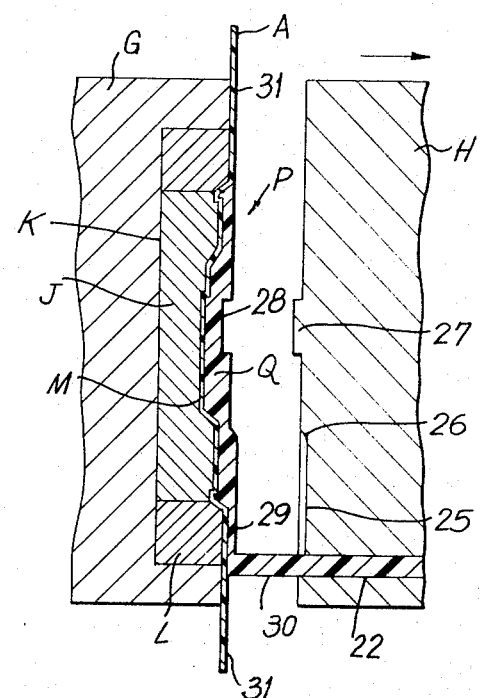
FIG. 3 is a transverse vertical sectional view similar to FIG. 2 showing the platens separated and the plaque ready to be separated from the mold.

In molding as shown in FIGS. 2 and 3, there are provided a female mold or fixed platen G and a movable or male platen H. The mold itself J is suitably formed and mounted in the recess K inside of the frame L.

Figure 4:
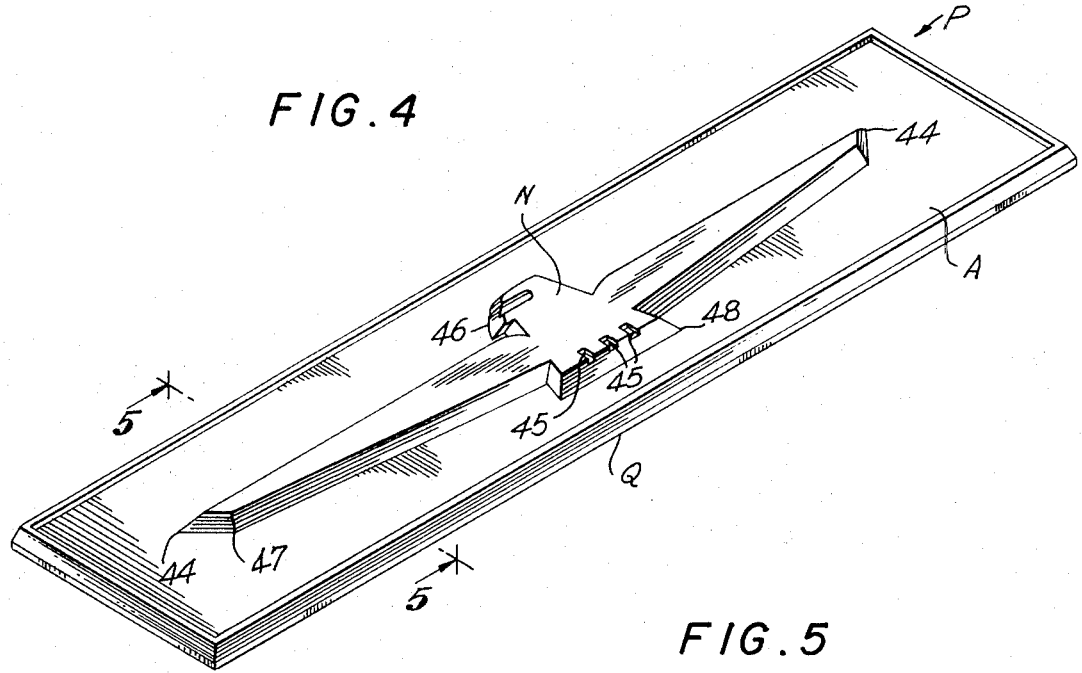
FIG. 4 is a top perspective view upon an enlarged scale as compared to FIGS. 2 and 3 showing the finished plaque.

The recess M, which has been cut and engraved in the central mold element J, is the reverse of the configuration shown at N in the plaque P (see FIG. 4). The laminated cover sheet A of FIG. 1 is first placed across the mold J to cover its recess M and then the jaw H is clamped home with the periphery of the facing sheet A being tightly gripped around the cavity M as indicated in FIG. 2.

The heated and liquid plastic, preferably polyvinyl chloride or other molding plastic whether it be cellulose acetate, styrene, polyethylene or ABS, is forced as indicated by the arrow 21 under high pressure of 1,000 pounds per square inch through the passageway 22 to one side of the cavity M at 23 and it will then be caused to flow at right angles as indicated at 24 through a relatively narrow transverse passageway 25 in contact with the rear face of the sheeting A until it reaches approximately one-third the way in, as indicated at 26, of the cavity M.

This will result in the sheeting A being stretched and forced into the cavity M under relatively high pressure, so that it will conform itself to the shape of the cavity which is the reverse of the shape indicated in FIG. 4. The front face of plastic body Q will have the general configuration of the mold J, but will be less sharp because of being insulated from the mold by facing sheet A. At the same time, recesses or cavities in the back surface of the plaque are formed by means of projection 27 on the face of movable platen H. Recess 28, of which there may be a number, will serve to take up excess plastic from the body of the plaque when it is subsequently being mounted. The excess material shown at 29 and 30 may be readily removed as may the extensions 31 of the facing sheet beyond the actual molded plaque P.

In FIG. 3, when the platen H has been withdrawn after the plaque has cooled to, for example, 200 to 225° F., the plaque may be stripped from the cavity M by means of the extension 31 of the cover sheet A. Water circulating devices may be employed in the platens G and H to achieve effective cooling to even as low as 150 to 175° F.

Figure 5:
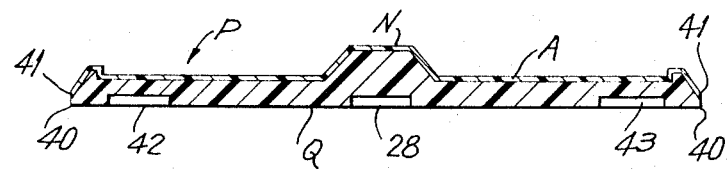
FIG. 5 is a transverse sectional view upon the line 5—5 of FIG. 4.

Referring to the plaque as shown in FIGS. 4 and 5, the body Q will extend as indicated at 40 below the lower edge 41 of the facing sheet. The recesses 28, 42 and 43 will serve to take up any excess plastic upon electronic sealing of the plaque P to a mounting surface.

The sharp edges indicated at 44 and the relatively small indentations indicated at 45 as well as the faithfulness of the design as indicated at 46 will be held after the release from the mold, and after the surface varnishing D has cooled, there will be no striation lines around the corners 44, 47 or 48 due to the effect of the surfacing D on the face of the Mylar B.

Furthermore, the plaque will withstand without deformation subsequent electronic sealing. Even when this is completed the amount of excess material as indicated at 40 below the edge of the Mylar facing 41 will separate the edge 41 from the back face Q of the plaque (FIGS. 4 and 5).

Figure 6:
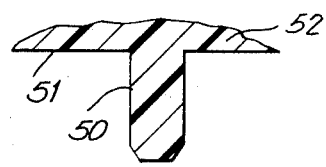
FIG. 6 is a fragmentary transverse sectional view showing an alternative construction, where a mechanical attachment prong is provided.
Figure 7:
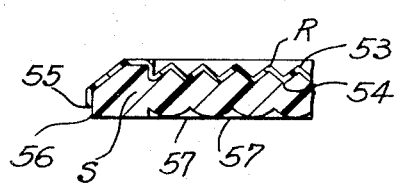
FIG. 7 is an alternative fragmentary transverse sectional view showing an edge of the plaque having a somewhat different cross section.

In FIG. 6 there is shown an extension 50, of which there may be one or more on the back surface 51 of the molded body 52, which may be held by screws or clips to a mounting face. In the alternative form in FIG. 7, the facing sheet R is provided with ridges 53 and recesses 54 formed in the top of the injection molded body S.

The facing will terminate at 55, leaving the plastic body S extending below the edge 55 by an amount indicated at 56. The transverse valleys 57 are designed to take up any excess molten resin upon electronic sealing procedures.

The present invention may be applied to plaques where it is desirable to have a plaque covered by a decorative facing of Mylar, plastic sheeting or fabrics with an integral junction between a body of injection molded plastic and the decorative facing.

The plaque may be attached either by electronic sealing or by mechanical connection.

As many changes could be made in the above injection molded decorative plaques, and many widely different embodiments of this invention could be made without departing from the scope of the claims, it is intended that all matter contained in the above description shall be interpreted as illustrative and not in a limiting sense.

What is claimed is:

1. A molded decorative plaque comprising: a plastic body portion having front and back surfaces with the front surface of the body portion contoured to define a decorative configuration; and a facing sheet disposed over the front surface of the body portion and sharply contoured in detail in conformance with the contour of said configuration in greater detail and sharper than the contours of said front surface, said facing sheet being a laminate comprising a plastic outer sheet, a layer of metal bonded to the undersurface of the outer sheet, and an inner plastic backing sheet bonded to the metal, the plastic of said backing sheet being compatible with the plastic of said body portion and integrally bonded with said body portion.

2. A plaque as in claim 1, and a protective layer of varnish on the outer surface of the outer sheet, said varnish layer having the configuration of the front surface of the body portion, but sharply contoured and detailed.

3. A plaque as in claim 2, in which said outer sheet of the laminate is polyethylene terephthalate.

4. A plaque as in claim 1, in which said outer sheet of the laminate is polyethylene terephthalate.

References Cited
UNITED STATES PATENTS

| | | | |
|---|---|---|---|
| 2,313,985 | 3/1943 | Bradshaw | 264—259 |
| 2,584,841 | 2/1952 | Caprez et al. | 40—8 |
| 3,013,919 | 12/1961 | Bialy | 161—119 |
| 3,436,297 | 4/1969 | Brooks et al. | 161—119 |
| 3,471,355 | 10/1969 | Truesdell et al. | 161—119 X |

WILLIAM A. POWELL, Primary Examiner

U.S. Cl. X.R.

156—245, 500; 161—44, 88, 149, 413; 264—257, 259